US010700943B2

(12) United States Patent
Ahlport et al.

(10) Patent No.: US 10,700,943 B2
(45) Date of Patent: Jun. 30, 2020

(54) SYSTEM AND METHOD FOR COLLECTION OF RADIO ENVIRONMENT INFORMATION USING A LIMITED DATALINK

(71) Applicant: PACIFIC CUSTOM SYSTEMS, INC., Mountain View, CA (US)

(72) Inventors: Steven Frederick Ahlport, San Diego, CA (US); Andy Von Stauffenberg, San Diego, CA (US)

(73) Assignee: PACIFIC CUSTOM SYSTEMS, INC., Mountain View, CA (US)

( * ) Notice: Subject to any disclaimer, the term of this patent is extended or adjusted under 35 U.S.C. 154(b) by 63 days.

(21) Appl. No.: 15/994,975

(22) Filed: May 31, 2018

(65) Prior Publication Data

US 2018/0351826 A1   Dec. 6, 2018

Related U.S. Application Data

(60) Provisional application No. 62/514,631, filed on Jun. 2, 2017.

(51) Int. Cl.
*H04W 24/08* (2009.01)
*H04B 17/23* (2015.01)
(Continued)

(52) U.S. Cl.
CPC .......... *H04L 41/22* (2013.01); *G06F 3/04842* (2013.01); *G06T 11/20* (2013.01);
(Continued)

(58) Field of Classification Search
CPC ....... H04L 41/22; H04B 17/23; H04B 17/336; H04W 24/08; G06T 11/20; G06F 3/167; G06F 3/04842
See application file for complete search history.

(56) References Cited

U.S. PATENT DOCUMENTS 6,018,659 A     1/2000 Ayyagari et al.
7,459,898 B1 *  12/2008 Woodings .............. G01R 23/16
                                                  324/76.19
(Continued)

FOREIGN PATENT DOCUMENTS

CN    201222741 Y    4/2009
CN    107579802 A    1/2018
(Continued)

OTHER PUBLICATIONS

Crnovrsanin, Tarik et al., "A system for visual analysis of radio signal data", 2014 IEEE Conference on Visual Analytics Science and Technology (VAST), IEEE, Oct. 25, 2014, pp. 33-42, XP032736882, DOI: 10.1109/VAST.2014.7042479 [retrieved on Feb. 13, 2015] Sections 1 and 3 and 4.5, in 10 pages.

(Continued)

*Primary Examiner* — Dong-Chang Shiue
(74) *Attorney, Agent, or Firm* — Procopio, Cory, Hargreaves & Savitch LLP; Lisel M. Ferguson

(57) ABSTRACT

Systems and methods for analyzing and displaying radiofrequency (RF) information collected at a radio sensor are provided. The method can include receiving, analyzing and buffering RF signal information at a radio sensor. The radio sensor can relay the buffered signal data and related metadata to a ground station for display, review, and playback. The buffered signal data can be stored in a memory of the ground station, each RF signal of the plurality of RF signals having an associated signal data buffer in the memory. The ground station can then display activity boxes on a box display indicating an activity level or an amount of data buffered relating to an associated RF signal. The system can further display activity symbols on an activity display each activity symbol depicting a timewise display of the spectral data and/or an amount of signal data buffered.

17 Claims, 5 Drawing Sheets

(51) Int. Cl.
*H04L 12/24* (2006.01)
*G06F 3/0484* (2013.01)
*G06T 11/20* (2006.01)
*H04B 17/336* (2015.01)
*G06F 3/16* (2006.01)

(52) U.S. Cl.
CPC ............ *H04B 17/23* (2015.01); *H04W 24/08* (2013.01); *G06F 3/167* (2013.01); *H04B 17/336* (2015.01)

(56) References Cited

U.S. PATENT DOCUMENTS

| | | | |
|---|---|---|---|
| 9,332,545 B2 | 5/2016 | Karlsson | |
| 2003/0198200 A1* | 10/2003 | Diener | H04L 1/1664 370/329 |
| 2006/0089103 A1* | 4/2006 | Osburn | H04W 24/00 455/67.13 |
| 2006/0212929 A1 | 9/2006 | Karlsson | |
| 2008/0091466 A1* | 4/2008 | Butler | G06Q 10/06 705/2 |
| 2010/0020707 A1* | 1/2010 | Woodings | H04L 43/045 370/252 |
| 2014/0241251 A1* | 8/2014 | Karlsen | H04W 76/34 370/328 |
| 2015/0080044 A1* | 3/2015 | McHenry | H04W 16/14 455/515 |
| 2016/0013875 A1 | 1/2016 | Barsumian et al. | |
| 2018/0062732 A1 | 3/2018 | Beckner et al. | |

FOREIGN PATENT DOCUMENTS

| | | |
|---|---|---|
| WO | 2012118418 A1 | 9/2012 |
| WO | 2014144831 A1 | 9/2014 |

OTHER PUBLICATIONS

International Search Report and Written Opinion dated Sep. 3, 2018 for related International Application No. PCT/US2018/035727, in 15 pages.

* cited by examiner

SYSTEM AND METHOD FOR COLLECTION OF RADIO ENVIRONMENT INFORMATION USING A LIMITED DATALINK

CROSS REFERENCE TO RELATED APPLICATIONS

This application claims priority to U.S. Provisional Application Ser. No. 62/514,631, filed Jun. 2, 2017, entitled "SYSTEM AND METHOD FOR COLLECTION OF RADIO ENVIRONMENT INFORMATION USING A LIMITED DATALINK," the contents of which are hereby incorporated by reference in their entirety.

BACKGROUND

Technical Field

This disclosure is related to radiofrequency surveillance. More specifically, this disclosure relates to systems and methods for detecting and storing information related to radio signals or radiofrequency (RF) transmissions and displaying such information to a user.

Related Art

Signals intelligence (SIGINT) sensor systems can include large antenna arrays that receive RF transmissions. The RF transmissions can be sorted, stored, and analyzed by one or more operators that may review or analyze the transmissions, signal by signal. SIGINT systems or other electronic surveillance (ES) systems can provide information related to direction finding (DF), signal type, emitter type, and content. Such SIGINT or ES systems may have several complex components that require significant training to efficiently and effectively employ making operations time intensive and requiring multiple users to implement.

SUMMARY

This disclosure addresses a systems and methods for radio signal collection that permits understanding of the entire range of activities with a smaller number of support personnel, while minimizing datalink requirements between the radio sensor and the collection operator. The disclosed system enhances the volume of information made available in an understandable way, by a limited number of operators. This can further to enable the operators to focus their attention on radio signals emitted by high value contacts. The system can further buffer signal information at the radio, indicate to the operator(s) that the buffered data is available for review, and provide the operator access to at least a portion of the information to make decisions about the full set of information.

One aspect of the disclosure provides a system provides a method for displaying radiofrequency (RF) information collected at a radio sensor. The method can include receiving signal data from a radio sensor at a receiver of a ground station. The signal data can be associated with a plurality of RF signals received at the radio sensor. The radio sensor can be configured to buffer data related to a subset of the plurality of RF signals. The method can include storing the signal data in a memory of the ground station, the signal data including metadata data associated with each RF signal of the plurality of RF signals. The method can include determining, by one or more processors coupled to the memory, an activity level of each RF signal based on the metadata. The method can include assigning, by the one or more processors, a color and fill to an activity box of plurality of activity boxes, each activity box corresponding to a single RF signal of the plurality of RF signals. The method can include displaying, by the one or more processors, the plurality of activity boxes on a box display of a user interface.

Another aspect of the disclosure provides a ground station for receiving and displaying radiofrequency (RF) information collected at a radio sensor. The ground station can have a receiver configured to signal data from a radio sensor, the signal data being associated with a plurality of RF signals received at the radio sensor, the radio sensor being configured to buffer data related to a subset of the plurality of RF signals. The ground station can have a memory configured to store the signal data, the signal data including metadata data associated with each RF signal of the plurality of RF signals. The ground station can have one or more processors operably coupled to the receiver and the memory. The one or more processors can determine an activity level of each RF signal based on the metadata. The one or more processors can assign a color and fill to an activity box of plurality of activity boxes, each activity box corresponding to a single RF signal of the plurality of RF signals. The ground station can have a user interface operably coupled to the one or more processors and configured to display the plurality of activity boxes via a box display.

Another aspect of the disclosure provides a non-transitory computer readable medium comprising instructions. When executed by one or more processors the non-transitory computer readable medium cause a computer to receive signal data associated with a plurality of RF signals received at a radio sensor, the radio sensor being configured to buffer data related to a subset of the plurality of RF signals. The non-transitory computer readable medium cause a computer to store the signal data in a memory, the signal data including metadata data associated with each RF signal of the plurality of RF signals. The non-transitory computer readable medium cause a computer to determine an activity level of each RF signal based on the metadata. The non-transitory computer readable medium cause a computer to assign a color and fill to an activity box of plurality of activity boxes, each activity box corresponding to a single RF signal of the plurality of RF signals. The non-transitory computer readable medium cause a computer to display the plurality of activity boxes on a box display of a user interface.

Other features and benefits are explained and will be fully appreciated with a review of the following description.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

This disclosure relates to various components, methods, and modular systems for conducting SIGINT operations.

The system can include various components or modules used for collecting, analyzing, and displaying information related to RF signals. The system may be referred to herein as a modular airborne SIGINT system. The system and associated methods can be related to ES, SIGINT, communications intelligence (COMINT), and/or electronics intelligence (ELINT) as needed. While an airborne system may be used as a primary example, surface-based (e.g., land or water) or subsurface-based systems can implement similar methods and components. The system can be separated into one or more components or modules. Each module can provide a distinct function. In some examples, the system can have a radio sensor deployed aboard a sensor platform and at least one operator console or remote operator station communicatively coupled to the radio sensor. The operator console may also be referred to herein as a ground station. The system on a large scale can be designed to be a modular, scalable, flexible, tactical intelligence collection sensor. The system can have a signals sensor, which can be installed aboard a sensor platform (e.g., an aircraft, or other type of land or waterborne vehicle), while the ground station can receive the collected data and send sensor commands.

The disclosed system and methods can provide the complete radio environment monitoring with a limited number of operators and a limited datalink. Such a system can be relevant to, for example, small military forces that need increased situation awareness but have limited available operators. This is additionally relevant to unmanned aerial vehicles (UAVs) or small UAVs (SUAS) that provide a signal monitoring capability across a limited datalink.

The system can have a collection of operator displays that enable a small number of operators to exploit one or more short-duration memory buffers to quickly record, analyze, and prosecute a large number of signals, making rapid, but informed decisions as to what information to keep and what information to ignore.

Figure 1:
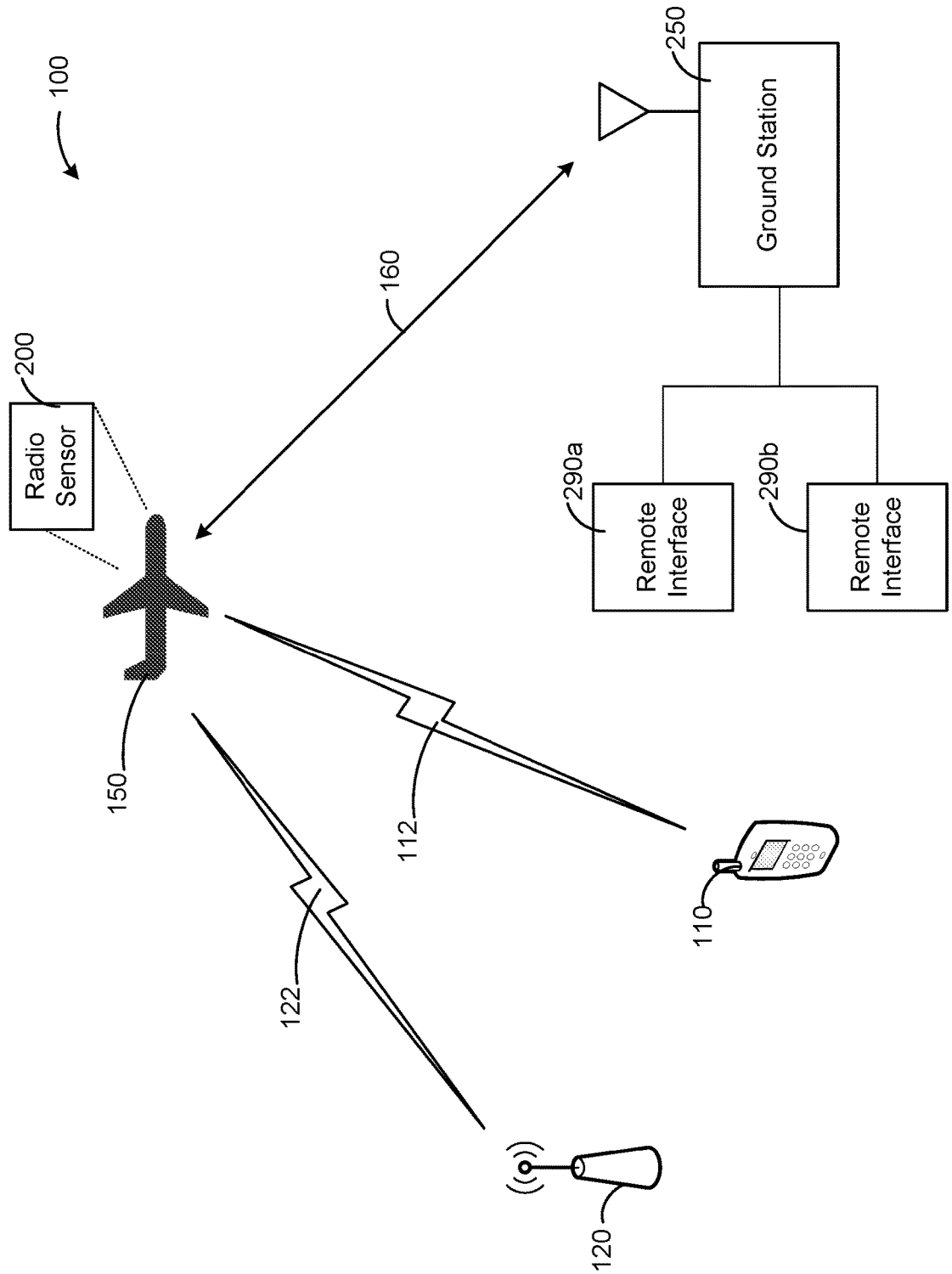
FIG. 1 is a graphical representation of an embodiment of a signal monitoring system.

FIG. 1 is a graphical representation of an embodiment of a signal monitoring system. A signal monitoring system (system) 100 can have a sensor platform 150. The sensor platform 150 can be a UAV, airplane, helicopter, or other airborne asset. The sensor platform 150 can also be other vehicles, such as a land-based vehicle, surface- or water-based vehicle, or a sub-surface based vehicle, as needed. The sensor platform 150 can have radio sensor 200. The radio sensor 200 can be a system or collection of subsystems configured to receive various RF signals 112, 122 from one or more emitters 110, 120, respectively. The RF signals 112 can be from, for example, various mobile electronic devices (mobile phones, PDAs, mobile radios/transmitters, or various mobile computing devices). Similarly, the RF signals 122 can be from, for example, various stationary RF emitters (e.g., towers). Only two signals 112, 122 are shown for ease of description, however there may be hundreds or even thousands of signals present.

The radio sensor 200 can receive, process, record, buffer and/or transmit information related to the signals 112, 122 to a ground station 250 for analysis. The radio sensor 200 can also perform analysis of the received RF signals 112, 122 to derive, among other things, frequency, bandwidth, wavelength, source direction, content, and emitter or source location, among other signal characteristics.

The radio sensor 200 can transmit information about the RF signals 112, 122, in addition to buffered recordings of the signals themselves to the ground station 250 via a datalink 160. The radio sensor 200 can communicate with the ground station 250 via the datalink 160. The datalink 160 can be any wireless protocol over which the radio sensor 200 is deployed. The datalink 160 may be a subsystem provided by the sensor platform 150. The radio sensor 200 can relay spectral information about a plurality of signals (e.g., the signals 112, 122). Then, based up on commands from the ground station 250, select one or more channels, each capturing a signal for relay to the ground station 250.

The system 100 can also have one or more remote interfaces 290 (labeled as remote interfaces 290a, 290b) coupled to the ground station 250. The remote interface 290 can allow a remote operator to access and review the signal information remotely.

Figure 2:
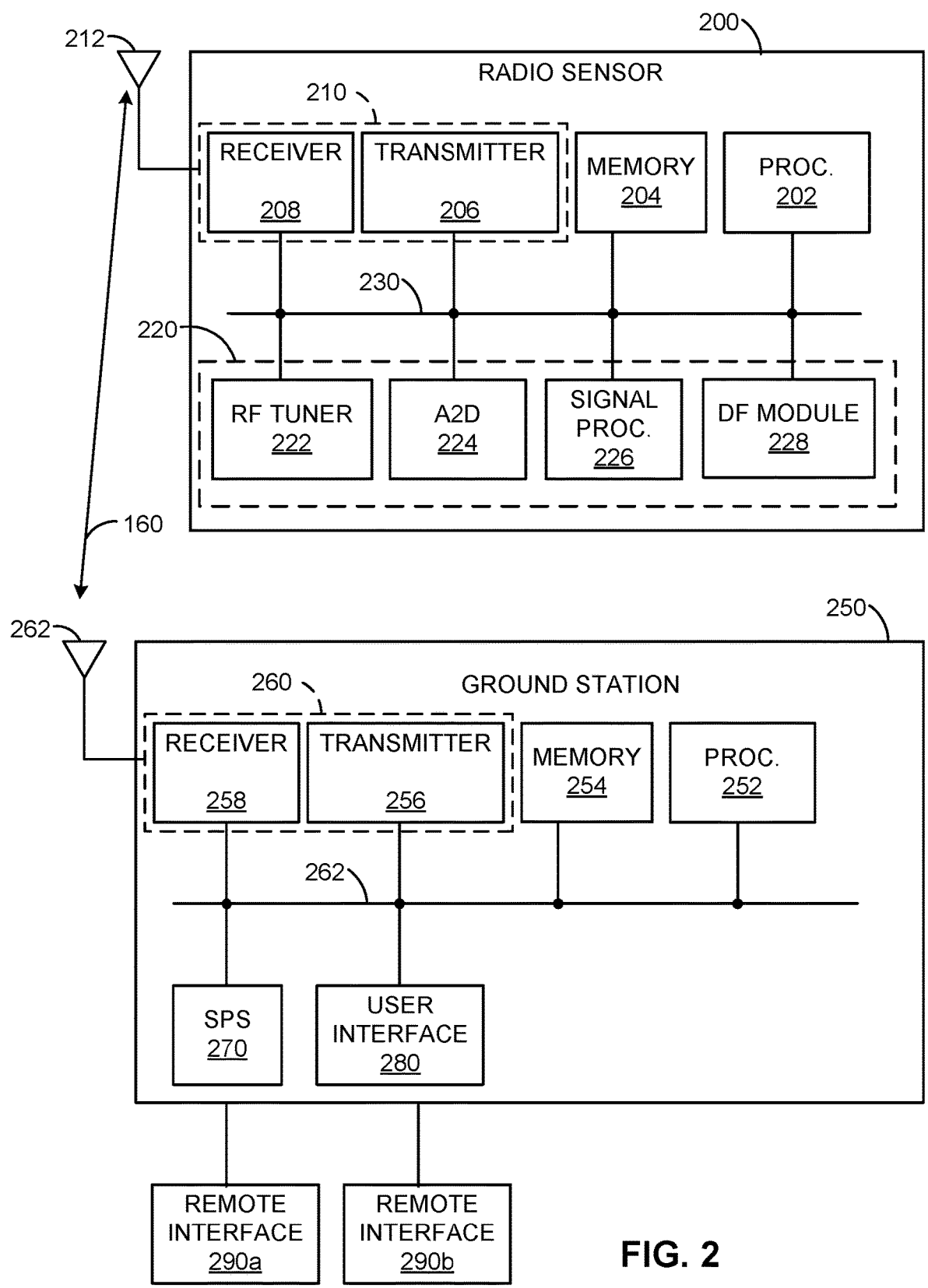
FIG. 2 is a functional block diagram of an embodiment of devices for use with the system of FIG. 1.

FIG. 2 is a functional block diagram of an embodiment of devices for use with the system of FIG. 1. The radio sensor 200 can have one or more processors or microprocessors, labeled as processor 202. The processor 202 can controls operation of the radio sensor 200. The processor 202 can also be referred to as a central processing unit (CPU). Processing can include various methods for converting raw RF data to usable information, such as recognizing that a signal exists, or extracting any audio signal corresponding to the digital data of the signal. These functions can be implemented in conjunction with, for example, the signal processing subsystem described below.

The processor 202 can include or be a component of a processing system implemented with one or more processors 202. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The radio sensor 200 can also have a memory 204 coupled to the processor 202. The memory 204 can include both read-only memory (ROM) and random access memory (RAM). The memory 204 can provide instructions and data to the processor 202. At least a portion of the memory 204 can also include non-volatile random access memory (NVRAM). The processor 202 can perform logical and arithmetic operations based on program instructions stored within the memory 204. The instructions in the memory 204 can be executable to implement the methods described herein.

In some embodiments, the memory 204 can be implemented to store, for example, information related to the signals 112, 122 including the signals themselves. The memory 204 can have, for example, one or more circular buffers to receive and store information related to the signals 112, 122 for recall, review, and analysis. The circular buffers can store information related to, for example, the signals 112, 122 for a continuous period of time. For example, the circular buffers can store information related to the last five minutes of received traffic from one or more of the signals 112, 122. In some embodiments, a buffer of the memory 204 can be assigned to receive and store information or data related to a single signal. Other times can be provisioned or programmed as needed.

In some embodiments, multiple processors 202 may be present in each radio sensor 200. For example, each processor 202 can supply a separate buffer within the memory 204 for an assigned subset of data associated with the received signals 112, 122. The buffers can be sized to hold data associated with the last 5-20 minutes or more of received signals 112, 122. In some examples, less than 5 minutes may be insufficient to time to allow an operator to act on buffered data, so that longer duration buffers are implemented. The buffers (e.g., the memory 204) can permit an individual user to be more efficient in their extraction of useful information from the radio signals (e.g., the signals 112, 122). The system 100 can use the buffers of the memory 204, to help focus the associated graphical user interface (GUI) (see below description) on the buffered signal data. The individual buffers can facilitate a concise graphical presentation, on a per-signal basis, providing easy to access the buffered data, while supporting enhanced awareness of the common situation with a limited datalink bandwidth.

The processing system and the memory 204 can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The device 200 can also include a transmitter 206 and/or a receiver 208 to allow transmission and reception of data between the device 200 and a remote location. The transmitter 206 and the receiver 208 can be combined into a transceiver 210. The device 200 can also have one or more antennas 212 electrically or communicatively coupled to the transceiver 210. The device 200 can also include (not shown) multiple transmitters, multiple receivers, multiple transceivers, and/or multiple antennas as needed for various communication standards. The one or more antennas 212 can also be resident on, or a part of, the sensor platform 150, for example.

Embodiments of the radio sensor 200 can have a signal processing subsystem (SPS) 220. The SPS 220 can have one or more RF tuners 222. Some embodiments of the radio sensor 200 (and the SPS 220) can have one, two, four, or more RF tuners 222 adapted to fit the size and functional constraints of the sensor platform 150. The radio sensor 200 can therefore be scalable to fit various sizes of sensor platform 150. The SPS 220 can have an analog to digital converter (A2D) 224. The SPS 220 can have a signal processor 226, having one or more FPGAs including, for example, a digital signal processor (DSP) or signal detector as needed. The FPGAs, for example, can be used to collect the digital values from the A2Ds 224 for example, and apply various computations to those values, such as Fast Fourier Transforms (FFTs) and Finite Impulse Response (FIR) filtering. The FPGAs can function in cooperation with the signal processor 226 processor for subsequent data handling.

In some examples, various electronic architectures are possible in which the SPS 220 can combine the RF tuners 222, the A2Ds 224, the signal processor 226 into, a single radio sensor component for example, to maximize the use of space and weight capacity of the sensor platform 150. For example, two RF tuners 222 may be coupled to one A2D 224, or two A2Ds 224 can be coupled to one FPGA or the signal processor 226. Other embodiments may split the flow of information or data into multiple trees for parallel processing, for example. In such a case more than one signal processor 226 may be present.

In some embodiments, the radio sensor 200 may be required to receive and analyze wide RF spectra. In such embodiments, the radio sensor 200 may have more than one SPS 220 to monitor the desired RF spectra. Thus, the SPS 220 circuitry and one or more components of the radio sensor 200 (e.g., the transceiver 210) or the SPS 220 (described below) may be duplicated or replicated according to desired RF coverage. In some embodiments, there can be n-number of circuit replicas. Each circuit replica can cover approximately 20 MHz. In some examples six circuit replicas (e.g., six copies of the SPS 220 or other applicable circuitry) may be present providing coverage for 120 MHz. In some other embodiments, as many as 28 or more circuit replicas can be present, each covering in excess of 36 MHz apiece for a frequency span of 2-1000 MHz.

In some embodiments, the SPS 220 can determine RF spectral data about every signal 112, 122 within a given spectrum of frequencies. The RF spectral data can include frequency information in a snapshot of time. For example, the radio sensor 200 can receive a plurality of signals 112, 122, perform Fast Fourier Transforms (FFTs) of the received RF energy and determine the presence of multiple frequencies and their respective power levels. This RF spectral data can be downlinked to the ground station 250. The RF spectral data can provide an overall picture of the RF energy in a given environment while minimizing bandwidth on the datalink 160. For example, downlinking RF spectral data requires significantly less bandwidth than an entire signal.

In some embodiments, the SPS 220 (e.g., the signal processor 226) in conjunction with the processor 202 and memory 204, for example can decode and demodulate one or more of the received signals 112, 122. The decoded and demodulated information can be stored in the memory 204 and later transmitted to the ground station 250.

In some embodiments, the processing of signals by the radio sensor 200 can include determination of metadata about every signal 112, 122 within the received signal bandwidth. The received signal bandwidth can be based on capabilities of the RF tuners 222 and their ability to receive and process the data signals 112, 122. The metadata can include information related to, or parameters of the signals 112, 122 such as signal frequency, signal bandwidth, signal-to-noise ratio (SNR), a time at which the signal became active (otherwise referred to herein as UpTime), and time that the signal became inactive (otherwise referred to herein as DownTime). The metadata can be determined by various processes implemented by the SPS 220 or the signal processor 226 (e.g., fast Fourier transforms (FFTs)) of the signal environment. The metadata can be transmitted to the ground station 250, to provide basic signal awareness to one or more operators. The metadata can accompany the RF spectral data on the datalink 160 to the ground station 250.

In some examples, the number of signals received by the radio sensor 200 can be very large and can span large bandwidths. Certain RF environments can have 2000 or more signals of signals between 2 MHz and 3000 MHz. This can be present a difficult scenario for a limited number of operators to analyze such a large amount of information.

In some embodiments, the processor 202, for example, in conjunction with one or more of the SPS 220 and the memory 204, can determine of a type of signal or signal type of the signals 112, 122 received. The SPS 220 can extract the data from a single received channel (e.g., bandwidth) and determine the type of signal present. A given signal can have one or more identifiable characteristics, or a "structure," that can indicate a signal type. In this sense, the signal type and therefore the identifiable characteristics can be defined by a standard protocol. For example, the automatic identification system (AIS) includes messages having a signal type that bears an identification (ID) tag and a latitude and longitude of a ship equipped with an AIS transponder. In such an example, if the signal 112 is an AIS signal, the processor 202 and/or the SPS 220 can identify the incoming signal 112 as a 9600 Gaussian Minimum Shift Keying (GMSK) modulation. The SPS 220 can further determine a number of bits in the message (e.g., the signal 112) and identify the format a standard AIS message. So in this example, the signal type is determined as AIS.

The SPS 220 can also have a stored database (e.g., the memory 204) of various types of signal signatures and metadata it can use to predict of signal type for all signals 112, 122 at the time they appear, based solely on the above metadata. This can allow estimation of signal type based solely on metadata using a low power configuration. Such estimation can be based on a database lookup of previously stored signal details and metadata matches such as frequency, bandwidth, power level, sensor location, etc., providing the user increased situational and signal awareness using the limited information that is available.

The SPS 220 can have specialized hardware or specialized software to significantly compress the data related to the signals 112, 122 prior to transmitting it to the ground station 250 via the datalink 160. The hardware, software, or firmware dedicated to compressing such data may be referred to herein as a "compressor." The compressor(s) can perform the functions of at least a portion of the processor 202 and/or the SPS 220. For example, G.711 can be used for compression to 64 kbps per audio channel, or G.726 for ADPCM (adaptive differential pulse-code modulation) compression to 16/32 kbps per audio channel. However, 32 kbps ADPCM may be advantageous for radio monitoring use under certain circumstances. These examples are not limiting as other compression techniques may be employed as needed, depending on the types of collected signals, availability of technology, and the environment in which the sensor platform 150 is operating.

In some embodiments, the SPS 220 can use, for example, a combination of G.711 and AMBE 2+ (Advanced Multiband Excitation) compression (to 8 kbps) for audio data. Signal demodulation for certain digital signal types such as, Digital Mobile Radio (DMR), Next Generation Digital Narrowband (NXDN), Digital Private Mobile Radio (dPMR) etc., may be performed onboard the radio sensor 200, by the SPS 220, for example. In these cases, the data is already available in compressed bit format after signal demodulation at the sensor platform 150. For this, the compressor embodiments can vary based on requirements for a particular system embodiment, and can be limited by, or tailored to, available datalink bit-rate. The variation between different embodiments will include a choice of hardware versus software embodiment, and a choice of quantity of embodiments (i.e. quantity of channels being compressed for the downlink), which will vary based on such factors as cost and as total datalink bandwidth. Accordingly, only certain information related to the signals 112, 122 may be downlinked to the ground station 250. In some examples, if the quantity of compressors matches the quantity of signals 112, 122 that can be buffered, then the signals may not need to be buffered locally onboard the radio sensor 200.

The SPS 220 can also have a direction finding (DF) module 228. The DF module 228 can cooperate with the processor 202, the signal processor 226 and the one or more antennas 212 to determine a direction from which the signals 112, 122 emanate. This can be useful in determining a location (e.g., triangulate) of the source of the emitters associated with the signals 112, 122.

The radio sensor 200 can also have a communications bus 230 coupling all of the various components of described above. The communications bus 230 can further couple the radio sensor 200 to other components of the sensor platform 150, for example.

The radio sensor 200 can be communicatively coupled to the ground station 250 by the datalink 160. The datalink 160 can carry information related to the signals 112, 122 including the metadata and recorded versions of the signals 112, 122 themselves to the ground station for review and analysis. The datalink 160 can also carry uplink information, including commands, or other control functions to the radio sensor 200 and the sensor platform 150. In some embodiments, the datalink 160 can provide two way communications for downlink data associated with the signals 112, 122 as well as operational or control commands to the sensor platform 150 and the radio sensor 200. The datalink 160 can carry compressed data (e.g., compressed bits from the radio sensor 200 to the ground station 250.

The ground station 250 can have a processor 252. The processor 252 can be similar to the processor 202 and provide overall control for the ground station 250. The ground station 250 can have a memory 254 similar to the memory 204 providing, among other things, storage and/or buffering of information related to the signals 112, 122. This information can be stored for a desired or preprogrammed duration of time and recalled as needed. Data that sent to the ground station 250 can be stored to local devices (e.g., the memory 254), including FFT spectra (e.g., spectral data), signal metadata, audio in decompressed format (such as pulse-code modulation—PCM), and digital bits.

The ground station 250 can have a transceiver 260 similar to the transceiver 210 having a transmitter 256 and a receiver 258. The transceiver 260 and the transceiver 210 can have two-way communications between the radio sensor 200 and the ground station 250, via the datalink 160. In some embodiments, the datalink 160 can permit two-way communications between the radio sensor 200 and more than one ground station 250.

The ground station 250 can have an SPS 270 that can provide similar functions and capabilities as the SPS 220, for example. The SPS 270 can provide decoding of the signals 112, 122. The SPS 270 can also demodulate the signals 112, 122 based on the metadata, for example, in addition to other information gleaned by the radio sensor 200. The SPS 270 can receive, process, decode, and demodulate amplitude modulation (AM), frequency modulation (FM) signals. In some embodiments, the SPS 270 can also receive, decode, and demodulate signals encoded or modulated using certain other modulation and coding schemes (MCS) such as, pulse code modulation (PCM), On-Off keying (OOK), frequency shift keying (FSK), 2FSK, 4FSK, C4FM, Binary PSK (BPSK), Quadrature PSK (QPSK), 8PSK, Quadrature amplitude modulation (QAM), 4QAM, 16QAM, among other types of modulations.

The SPS 270 can for example, provide data decompression for the RF spectral data computed at the radio sensor 200. As noted above, the RF spectral data can include a snapshot of the power distribution (e.g., via FFTs) across a frequency range collected or received at the radio sensor 200 for a period of time. The spectral data may require decompression upon arrival at the ground station 250. The processor 202 (at the radio sensor 200) can generate signal metadata information related to each RF signal 112, 122 received at the sensor platform 150. As noted previously, the metadata can include, for example, frequency, bandwidth, modulation, noise power, signal-to-noise ratio, among other signal characteristics. This condensed information can be sent to the ground station 250 via the datalink 160 for processing.

The SPS 270 can then use the condensed information to create an approximation of the original RF spectral data. Thus, the operator can review "recreated" spectral data as if it were downlinked from the radio sensor 200 directly.

The system 100 is capable of taking infrequent (e.g., once every five seconds) complete spectrum data, and combining it with the signal metadata (e.g., once per 0.5 seconds) to reconstruct an approximation of the original spectrum. This can be performed periodically to minimize bandwidth usage. For example, this can be performed every 0.5 seconds. In some embodiments, the processor 202 and/or the SPS 220 (at the radio sensor 200) can receive and compress the spectral data with the metadata. This compressed information is transmitted to the ground station 250 where the processor 252 and/or the SPS 270 can use the downlinked information/data to recreate the spectrum for display. This can dramatically reduce bit rate on the datalink 160, with minimal impact to the operator interaction. The spectrum re-creation software in the SPS 270 is responsible for creating such an approximation of the spectrum data to the same format as the complete spectrum data.

The SPS 270 can then, in conjunction with the processor 252 and the memory 254, prepare the decompressed data and information related to the signals 112, 122 for display on a user interface (UI) 280. The UI 280 can be a graphical user interface (GUI). The UI 280 can have one or more displays used to display signal information and allow a user or operator to review and analyze the signals 112, 122. The UI 280 can also have one or more audio outputs to allow the user to listen to the audio content signals 112, 122, for example. The UI 280 can also have one or more input devices used to receive user inputs related to the review and analysis of the signals 112, 122. The inputs can include, for example, a touchscreen, mouse (or similar device), a keyboard, and/or a microphone. The operator can, via the UI 280, access the stored information (e.g., in the memory 254), including both historical signal data as well data that has recently arrived and/or is coming from the past few seconds of data storage.

The UI 280 can also present RF spectral data for the signals 112, 122 (or the reconstructed counterpart), signal metadata, digital bit data, and audio data available to an operator. All of these data types can be presented on a screen to the operator, and audio data can also be presented on speakers or headphones. The operator, using the UI 280, can select one or more signals to review based on the metadata and RF spectrum information. The processor 202 can then adjust which signals (e.g., the signals 112, 122) are decoded, demodulated, and buffered in the memory 204. This can avoid the need to downlink significant amounts of information related to all of the received signals. The selections can be communicated to the radio sensor 200 to only downlink, for example, signals of interest identified by the RF spectral data and the metadata.

In some examples, raw spectral data can be displayed on a spectral display or a waterfall display. The displays (e.g., the UI 280) can have a zoom capability, allowing the operator to examine subsets of the total information at greater detail. The display can also provide simple ways for the operator to select a different frequency of interest, such as clicking with a mouse on the display.

In some examples, certain frequency of interest data can be displayed by the UI 280. This can be provided in a text window for a single frequency that has been selected by the operator. The display can also present a subset of the metadata, such as the exact frequency at which the signal has been detected, and/or the bandwidth or signal-to-noise ratio.

Each of the above may be considered a "one-at-a-time" display, allowing the operator to focus on one radio/RF signal at a time. The operator can listen to one live signal, and then select another live signal, and continue on signal by signal. In some systems, there may be one signal and one display (e.g., the UI 280).

In some embodiments, including larger systems, (e.g., government systems) multiple one signal/one display systems may be used in parallel.

In some embodiments, the UI 280 can also display multiple signals in a single display for more efficient review and analysis.

The UI 280 can also include displays for system status and control. Such displays can present the status of the radio sensor 200, while permitting the operator to adjust the operations and other features, such as activating and deactivating the radio sensor, monitoring temperatures of various parts or components of the radio sensor 200 and adjusting the center frequency of one or more of the RF tuners 222.

The ground station 250 can also be communicatively coupled to the remote interfaces 290. The remote interfaces 290 can provide an operator not directly in contact with the sensor platform 150 or the radio sensor 200 to review and analyze any and all of the information gleaned from the signals 112, 122 at the ground station 250. Accordingly, the remote interfaces 290 can receive and display the information made available at the ground station 250. In some embodiments, the remote interfaces 290 can have some or all of the same components as the ground station 250. In some embodiments, the ground station 250 can function as a relay or server for supplying multiple remote users information related to the collected signal data.

The ground station 250 can have a communications bus 262 coupling all of the various components of the ground station 250 of described above, similar to the communications bus 230.

The UI 280 can display recorded or historical information (e.g., stored in the memory 204 and the memory 254 and their associate buffers). This can eliminate reliance on "live" signals (i.e. signals that are active right now), moving instead to reliance on "recently-live" signals or recorded signals. The "recently live" signals can be stored in the buffers and later recalled as needed. In RF environments having a limited number of emitters/emissions the system can automatically record all available signals without any operator interaction, and not exceed the number of buffers. For example, a "limited" number may include less than 20-50 emitters. In more dense RF environments, having for example, a large number of emitters (e.g., the emitters 110, 120), it may be necessary to transmit certain commands from the ground station 250 to the radio sensor 200 to optimize which radio frequencies are the priorities for collection to the memory buffers in the radio sensor 200. For example, a "large" number of emitters in this sense may be 200 to 1000 or more emitters. Such decisions or commands can be based on preset requirements or manual operator commands that identify (lists of) signals of interest or bandwidths of interest.

Figure 3:
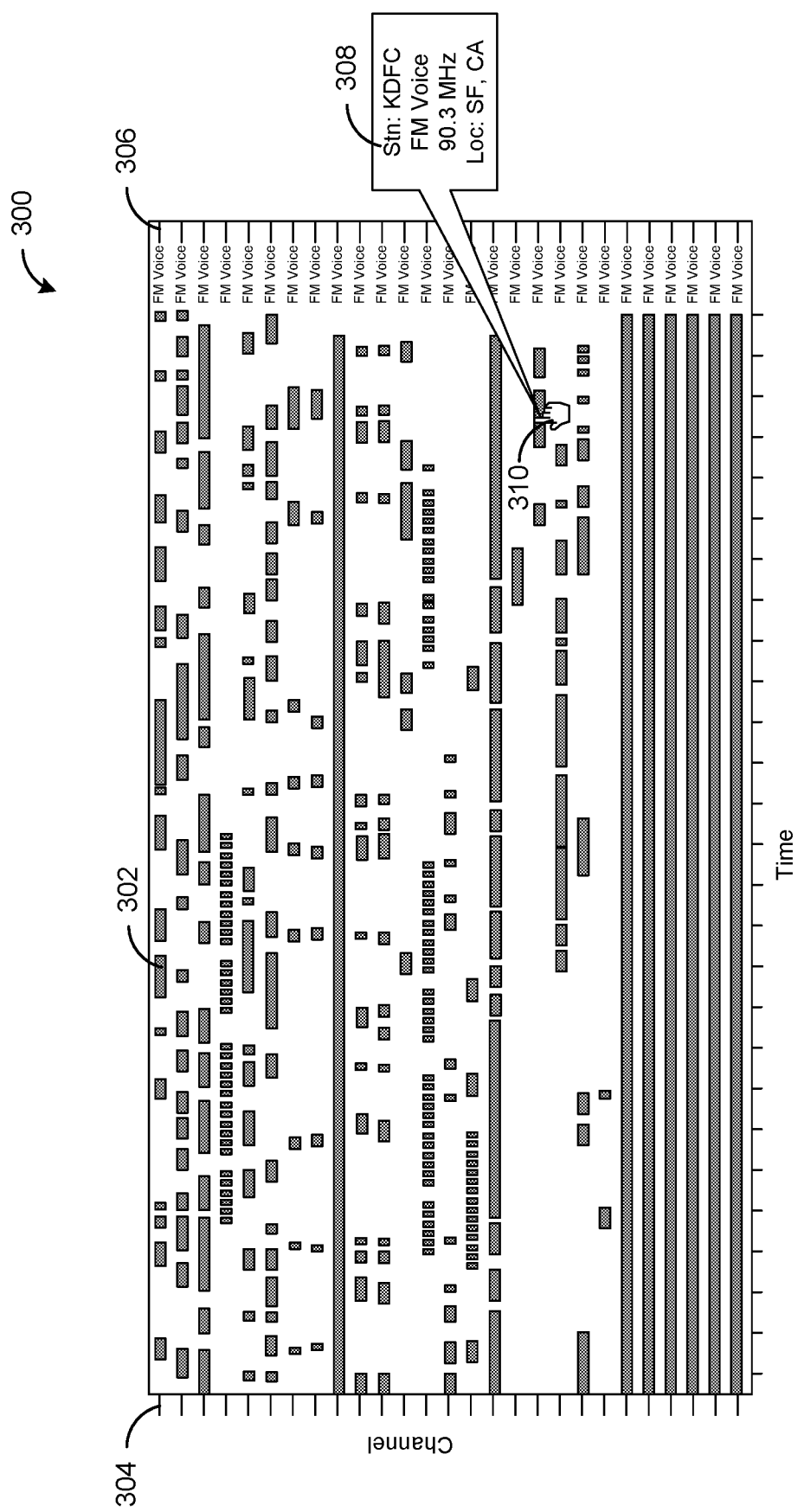
FIG. 3 is a graphical representation of an activity display 300 for use with the system of FIG. 1 and FIG. 2.

FIG. 3 is a graphical representation of an activity display for use with the system of FIG. 1 and FIG. 2. The UI 280 can provide one or more displays that can provide easy access to recordings of (raw signal information, in addition to demodulated and/or decoded recordings of conversations occurring over the signals 112, 122, for example. The activity display 300 can provide detailed information and recordings of previously receive signals (e.g., the signals 112, 122). The activity display 300 can be arranged according to time along the horizontal axis and a selected emitter along the vertical axis. The ordering of the emitters on the activity display 300 can be sorted based on user preference or interest, for example, or based on frequency. Individual activity symbols 302 can populate the activity display 300 and be referenced according to a received frequency 304 and/or a descriptor, for example. The length of the box can indicate a relative amount of time for which the signal associated frequency 304 (or descriptor) is/was active. The area containing the listing of the frequency 304 can also include a descriptor having an emitter name (e.g., a television station named KPIX), signal type, etc. The operator can select an activity symbol 302 to listen to the signal starting at the indicated time that has been stored in the buffered duration of the recorded signal associated with the frequency 304, for example. Only one activity symbol 302 is labeled for clarity; however each of the gray boxes in FIG. 3 is an activity symbol 302.

Figure 4:
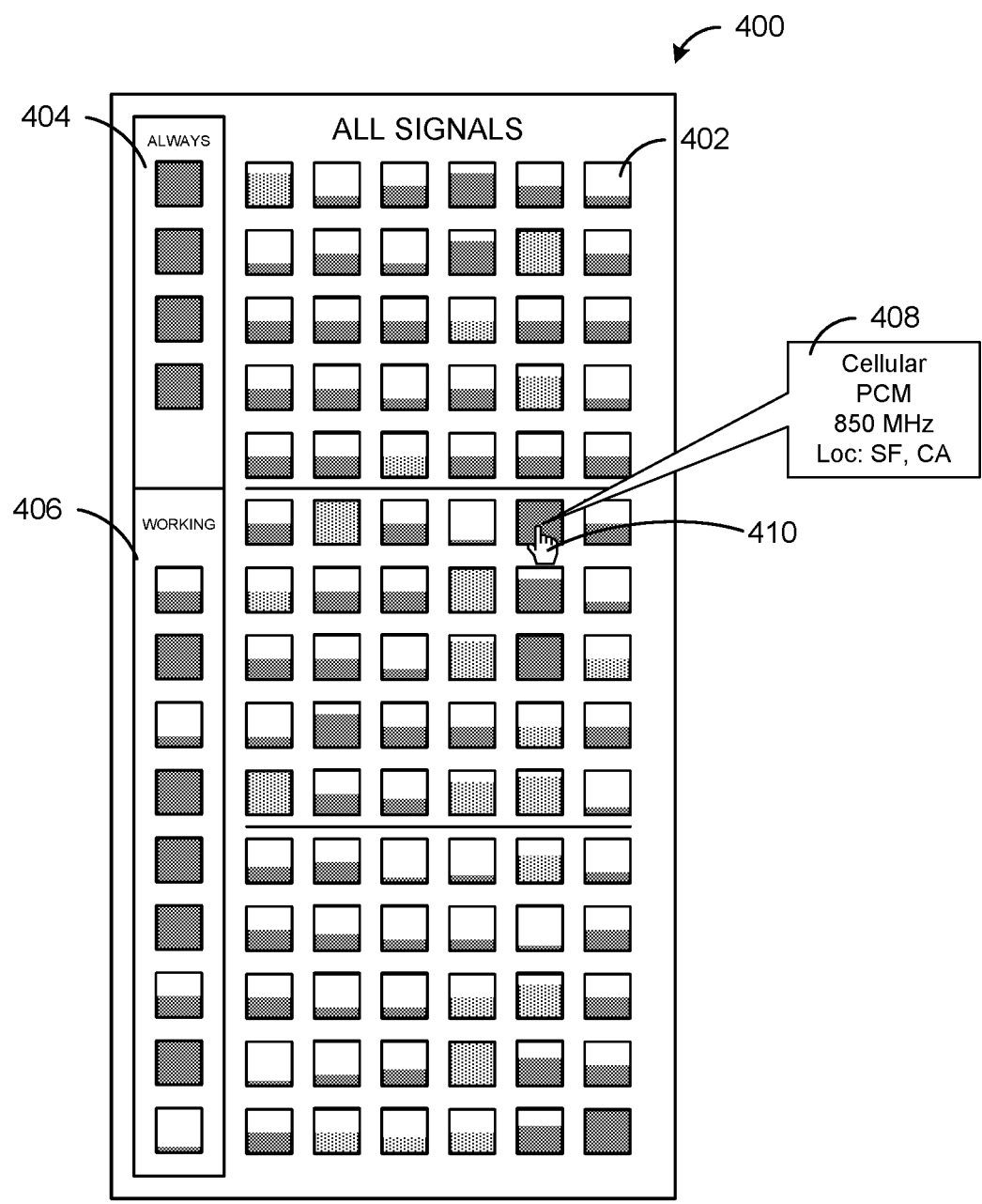
FIG. 4 is a graphical representation of a box display 400 for use with the system of FIG. 1 and FIG. 2.

The activity display 300 can also indicate one or more pieces of metadata 306. In the illustrated example, the metadata 306 indicates a type of signal (e.g., FM voice) that is recorded in the frequency 304. The activity symbol 302 can then be discerned as a period of a recording of an FM voice channel in the frequency 304, for example. The metadata 306 can also include other user-definable information related to the activity symbol 302, such as a time duration. Certain other "mouse-over" information can also be displayed in a popup box 308 as a cursor 310 is positioned over symbol 302 one of the other plurality of activity symbols 302 in the activity display 300. As one example, the popup box 308 in FIG. 3 indicates metadata indicating that the selected activity box is related to a voice (e.g., music or other audio) channel from the channel KDFC in San Francisco is transmitting on 90.3 MHz. The metadata 306 can also indicate that associated signal referenced can be, for example, an AM, FM, PCM, frequency agile, frequency hopping, emitter location (e.g. Santiago, Chile) or association (e.g. police/medical/etc.), among other aspects and signal characteristics, FIG. 4 is a graphical representation of a box display 400 for use with the system of FIG. 1 and FIG. 2. The box display 400 presents densely arranged activity boxes 402 that each represent a frequency or signal (e.g., a channel) that has been received in the past (e.g., recent past). Based on operator configuration, the "recent past" can refer to the past two to four hours, or can refer to the past two to four weeks. At least a portion of one or more of the frequencies or signals can be recorded for later reference. For example, the box display 400 can have a large array (e.g., up to 200 or more) of activity boxes 402. Not all of the activity symbols are labeled for simplicity, but each box shown is an activity box 402. The activity boxes 402 can be arranged based on operator preference for example. In some embodiments, the ordering can be programmed or predetermined. Ordering can be based on an indication of importance or priority of the signals, frequency, recent occurrence or recent reception of the signals, or some other scheme as desired. The box display 400 can also include an "inhibit symbol" option that can prevent the box display 400 from showing one or more designated signals. Such a signal can be labeled as a signal not of interest (SNOI).

The box display 400 shown in FIG. 4 depicts 6×15 activity boxes 402 for ease of description. Each activity box 402 can represent a received signal (e.g., the signals 112, 122) or frequency. The box display 400 can depict an activity level of each frequency with a color or shading or a fill level of the activity boxes 402. Some of the activity boxes 402 are shown completely filled with a color while others are shown partially filled. This scheme of color and fill can indicate an activity level of the associated signals or frequencies. The activity boxes 402 can also be displayed along with one or more signal attributes that can be tied to the usefulness of that frequency. Usefulness, in this sense, may refer to a level of "importance" of a given signal. The usefulness can be based on signal type, tasking priority, location, or other applicable signal characteristic.

The UI 280 can receive inputs (e.g., touch, click, keystroke, gesture, etc.) related to such characteristics and display the activity boxes 402 accordingly. Such an arrangement can help the operator draw attention to not-currently-buffered signals that are recently active and of known interest. The center of the activity boxes 402 may be filled (e.g., shaded) to a level that is related (e.g., proportional) to the amount of recent traffic on that frequency/channel. Similarly, the outer ring of the activity boxes 402 may be colored (or grayscale) based on a definition of priority or "usefulness." Different colors can be implemented for different signal conditions, preferences, and characteristics. The colors, fill level of the activity boxes 402, and their outline color can provide the operator quick reference to a signal state and various characteristics of the signal associated with a given activity box 402. This arrangement can provide increased operator efficiency, offering quick reference to signals, while increasing awareness and minimizing workload through task prioritization. In some embodiments, the color and fill of each activity box 402 can be based on FFT metadata created at the radio sensor 200, combined with history since the meta-data was created to determine the color. The metadata is created for all received emissions (e.g., the signals 112, 122), and then whether it is stored to the memory 204, 254. For example, green may be used as a default color. As the signal is stored, in the memory 204, for example, the color of the activity box 402 may change to another color indicating the change (e.g., blue), and then to a third color when the downlinked signal data has reached the ground station 250. Different colors and shades of colors can be implemented to indicate the status of the signals.

An important user interaction with this display may be to decide which of the frequencies should/should-not be buffered, as well as which of the frequencies should be brought to (e.g., transferred to) the activity display for more detailed examination. This permits the user to quickly and easily interact with the large amount of information available at the UI 280, while focusing the user's attention onto the signals of high interest. This supports better understanding of the RF environment and more efficient use of time for the system operators.

In some embodiments, the box display 400 can have multiple subsections, such as a persistent section 404 and a working section 406. The persistent section 404 is marked "always" in FIG. 4 indicating that the selected signals will be (always) monitored whether or not any activity is detected on those channels. This can be a user-selection indicating specific signals or channels of interest. Thus, a cursor 410 can be used to drag the selected activity boxes 402 to the desired subsection. The working section 406 can include activity boxes 402 for sensor-selected channels. As described herein, certain preprogrammed behaviors can cause the radio sensor 200 to automatically select, (e.g., buffer and downlink) certain "signals of interest" based on predetermined criteria (e.g., activity level). The channels represented by the activity boxes in the working section 406 can also be user-selected. The channels represented by activity boxes 402 in the persistent section 404 and the working section 406 will further be the channels viewed in the activity display 300. In this way, the box display 400 can be used to populate the channels (e.g., the frequencies 304) displayed on the activity display 300. Conversely, should the user elect to use the activity display 300 first, the channels displayed in the activity display 300 will be shown in the persistent section 404 and the working section 406 when the user switches to the box display 400.

In some embodiments, certain information or data can be presented by hovering over (e.g., mousing over) a selected activity box 402 (or symbol 302). Similar to the popup box 308, using the cursor 410, a popup box 408 can display both long-term information about the frequency/signal (such as the type of signal, frequency, and an emitter location) as well as recent information (such as how many seconds it has been active in the past minutes). The activity level duration can be a user-selected metric or an otherwise predefined attribute of the box display 400.

One or more buffers can be reviewed by selecting one or more activity boxes 402. Active data in those buffers can then be made visible to the operator via, for example, the activity display 300. The operator can then cycle through the various signals/frequencies to listen to the type of audio information presented.

The activity display 300 can depict the various signals or frequencies of interest. Various colors can be used (e.g., instead of black and white shading as shown) to indicate signal status. For example a first color can be used to show that the signal has been active, but not buffered. A second color can be used to indicate the signal is buffered in the radio sensor 200 and ready for transmission to the ground station 250, for example. A third color can be used to indicate the signal has already been sent to the ground station 250 and thus available for immediate review (e.g., playback). A fourth color can be used to indicate the signal has been analyzed by the operator and found useful. A fifth color can be used to indicate the signal has been analyzed by the operators and found not useful.

The activity display 300 also shows which of the signal bursts are being listened to at the current time, using a "Halo" that surrounds the channels data at the time of the playback. The halo tracks the progress of the audio playback, providing a visual indicator to the operator of the progress through the radio burst, as well as the time-frame when this happened. In some embodiments, one color can be used for the left speaker/headphone, and another color can be used for the right speaker/headphone, so the operator can separately track each audio stream's progress.

Of special importance is the ability to view multiple different signal bursts. In some examples, radio signals may only be active a small percent of the time. The activity display 300 and the box display 400 permits the operator to focus on only those active periods. This can provide a significant advantage, as many frequencies may be active less than 10% of the time. The ability to jump between active transmissions/conversations ensures the operator can review more singles and increase efficiency of monitoring signals of interest. For instance, a single operator can monitor a dozen or more air-traffic control frequencies at one time, by cycling through each of the signal bursts (e.g., the activity boxes 402 or the activity symbols 302), listening to the signal until the conversation is either uninteresting or terminates, then move to another signal burst. In addition, when two transmissions overlap, it is possible to follow one conversation thread right away, and then shortly thereafter review the other, overlapping transmission or conversation thread.

Additionally the activity display 300 visually presents the cadence of activity, which becomes an indicator of the type of use (such as is it regular/periodic, is it infrequent, does this frequency go active just after another frequency went down). This permits a sense of context for the collected information that becomes valuable in determining relative importance.

The activity display 300 (FIG. 3) can provide detailed monitoring of a plurality of frequencies simultaneously (e.g., 30 or more frequencies/signals), limited only by screen space and operator control span, as one person can only deal with so many signals at a time. While it is recognized that one person can only deal with so many signals at a time, an advantage of this system is that it permits operator control of a larger number of radio signal frequencies.

In dense RF environments, or wide RF spans, there may be a large set of potential or active frequencies that need to be tracked. In some examples, over 200 signals may be present in a 30 MHz span, or over 1000 signals in a 200 MHz span—many times greater than can be depicted on an activity display 300. It may be important to provide awareness of a large number of signals using the box display 400, and select signals from the box display 400 to be added to the activity display 300, quickly examine past history of each signal based on information already available at the ground station 250 (e.g., in the memory 254), and be alerted to arrival of new information or signals. This arrangement can also allow the operator to release signals from the activity display 300 to allow room for more signals to later be assigned to the activity display 300 from within the user interactions with the box display 400. The release of information can be done with multiple approaches, including mouse clicks touches, and gestures.

It is valuable to have the activity display 300 populated from the ground station 250 data storage (e.g., the memory 254), because it is possible to instantly recover the known history of that frequency upon selection into the activity display 300. It is not necessary to await future information, because the data storage can be used to instantly populate the past history of the newly selected signal on the activity display 300.

The radio sensor 200 can continuously buffer data related to the surrounding RF environment, and continuously send information related to the received RF spectra (e.g., the signals 112, 122) to the ground station 250 autonomously (e.g., in the absence of operator direction).

Figure 5:
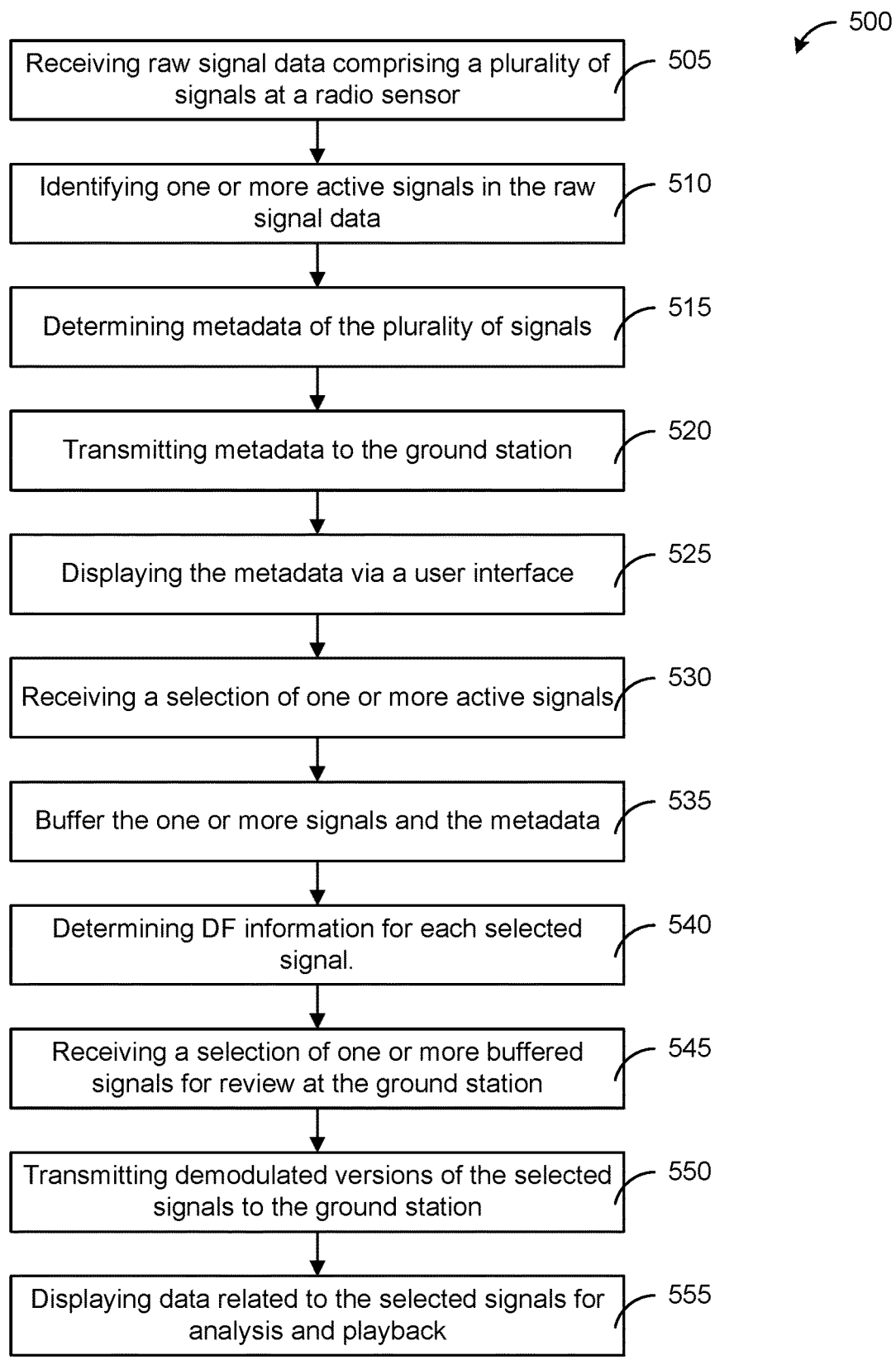
FIG. 5 is a flowchart of a method for analyzing and displaying one or more signals using the system of FIG. 1.

FIG. 5 is a flowchart of a method for analyzing and displaying one or more signals using the system of FIG. 1.

A method 500 can begin at block 505 when the radio sensor 200 receives a plurality of RF transmissions, for example, the signals 112, 122. The radio sensor 200 can receive raw signal data for an environment, spanning a large frequency span or bandwidth, as described above in connection with FIG. 2.

At block 510, the radio sensor 200 and more specifically, the SPS 220 and the signal processor 226, can analyze the raw signal data to identify one or more active RF signals (e.g., the signals 112, 122) within that frequency span. In some embodiments, the SPS 220 can decode and demodulate the signals 112, 122.

At block 515, the signal processor 226 can determine or extract one or more pieces of metadata related to the active RF signals, such as the signals 112, 122. The metadata can include signal type, frequency, modulation, UpTime, and DownTime, in addition to other characteristics such as those described above.

At block 520, the radio sensor 200 can transmit the metadata to the ground station 250. The processor 252 can then save the metadata to the memory 254, for example.

At block 525, the processor 252 or the SPS 270 can present the metadata for display at the UI 280 (or at the remote interface 290), for example. Such display can be accomplished using the activity display 300 or the box display 400.

At block 530, the processor 252 can receive, via the UI 280, a selection of one or more of the active signals on the display. This can indicate a need for subsequent collection and direction finding for the selected signals. In some embodiments, selection of the one or more active signals can be done at a mixture of the radio sensor 200 and in response to operator selections on the UI 280. For example, the radio sensor 200 (e.g., the processor 202/SPS 220) can, based on historical selections and preprogrammed or pre-directed behaviors, suggest signals of interest or make the selections autonomously. The selected signals can be a subset of the plurality of RF signals received at the radio sensor 200. In some examples, hundreds or thousands of signals may be present. The radio sensor 200 can generate and store metadata and RF spectrum information about most or all of such signals, however given bandwidth constraints only a subset or a few of the RF signals can be buffered and downlinked to the ground station 250. Thus, in one sense, the RF spectral data and the metadata provides a "thumbnail" to the operator providing an indication of the activity level of a given signal and a means for selecting signals of interest.

At block 535, the processor 202 and/or the signal processors 226 can store data related to each of the selected signals (e.g., the signals 112, 122) to buffers (e.g., buffer memory) in the memory 204.

At block 540, the processor 202, via the DF module 228, can determine DF information for each selected signal. This information can be sent to the ground station 250 via the datalink 160. The DF information can be derived periodically. The DF information can include a direction from which the associated signal was received. As new DF information is provided to the ground station, the processor 252 can determine a geolocation value for an emitter (e.g., the emitters 110, 120) associated with the signal. These values can be stored in memory with the metadata for the particular signal.

At block 545, the processor 252 can receive a selection of one or more of the buffers for demodulation at the radio sensor 200. Selection can be done at a mixture of the radio sensor 200 and in response to operator selection at the UI 280. For example, the processor 202 can execute certain preprogrammed behaviors to select or otherwise prioritize the signals that are buffered and downlinked. The demodulated, buffered RF signal data can be compressed for reduced transmission bandwidth.

At block 550, the radio sensor 200 can transmit the signal data (via the transmitter 206/transceiver 210) to the ground station 250. The buffered signal data can be transmitted in a compressed or uncompressed format. In some embodiments, the processor 252 can stored the RF signal data in a compressed or uncompressed format. If the signal data was compressed before transmission, the processor 252 may decompress the data prior to storage in the memory 254.

At block 555, the processor 252 display data related to the selected signals for analysis and playback. The processor 252 and/or the SPS 270 can further determine an activity level of each of the RF signals (e.g., the signals 112, 122) received from the radio sensor 200. Activity level can refer to an amount of data received, a duration of audio information contained in a particular RF signal, or other applicable metric over a period of time. The period of time can be predetermined and refer to an amount of signal data (for the given RF signal) in a given buffer. The processor 252 can then assign a color and fill to the activity boxes 402 based on such activity level. The processor 252 can then display an activity box 402 for each signal present in the buffered signal data received from the radio sensor. The activity boxes 402 are displayed via the box display 400 (FIG. 4).

Alternatively, the processor 252 can then assign a color and fill to the activity symbols 302 and populate the activity display 300 based on the received metadata and spectral data and time.

The processor 252 can further receive an input related to one or more of the activity boxes 402 on the box display 400. This can be a result of a user selecting one or more signals of interest, represented by the activity boxes 402. The processor 252 can then graphically display the signal data and information related to the selected activity boxes 402 as activity symbols 302 on the activity display 300 (FIG. 3). The activity symbols 302 can represent signal activity over a period of time. The activity symbols 302 can be selected to provide playback of the RF signal audio for the duration of the buffer. The horizontal length of each of the activity symbols 302 is representative of (e.g., proportional to) the amount of data or duration of audio, recorded for that particular signal.

In other embodiments, the data can be directly displayed to either the box display 400 or the activity display 300. In the event the radio sensor 200 is preprogrammed with certain behaviors, the radio sensor 200 can automatically buffer and downlink the (e.g., predetermined) signals of interest (e.g., the signals 112, 122). Therefore, the activity display 300 can be automatically populated with activity symbols 302 showing a graphical depiction of the amount of data or audio buffered, downlinked, and stored for playback. Thus, the method 500 can skip, for example, block 530 and automatically downlink buffered RF channels (e.g., the signals 112, 122) and display the symbols accordingly. In another embodiment, the box display 400 can show activity boxes 402 indicated an activity level of the one or more signals of interest.

The disclosed systems and methods set forth above provide various features that can be readily combined to ensure that each operator optimize their time for signals analysis and alleviate the concern for maintaining short-term awareness of RF traffic that can wax and wane before the operator can devote enough time for proper analysis.

Those of skill will appreciate that the various illustrative logical blocks (e.g., the various servers described herein), modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the disclosure. In addition, the grouping of functions within a module, block or step is for ease of description. Specific functions or steps can be moved from one module or block without departing from the disclosure.

The various illustrative logical blocks and modules (e.g., the various servers described herein) described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of transitory or non-transitory storage medium. An exemplary storage medium can be coupled to the processor such that the processor can read information from, and write information to, the storage medium. In the alternative, the storage medium can be integral to the processor. The processor and the storage medium can reside in an ASIC.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

What is claimed is:

1. A method for displaying radiofrequency (RF) information collected at a radio sensor, the method comprising:
   receiving signal data from a radio sensor at a receiver of a ground station, the signal data being associated with a plurality of RF signals received at the radio sensor, the radio sensor being configured to buffer data related to a subset of the plurality of RF signals;
   storing the signal data in a memory of the ground station, the signal data including metadata data associated with each RF signal of the plurality of RF signals;
   determining, by one or more processors coupled to the memory, an activity level of each RF signal based on the metadata, the activity level indicating an amount of data received on each RF signal;
   assigning, by the one or more processors, a color and fill to an activity box of plurality of activity boxes based on the activity level, each activity box corresponding to a single RF signal of the plurality of RF signals;
   displaying, by the one or more processors, the plurality of activity boxes on a box display of a user interface;
   receiving, at the one or more processors, a selection of one or more activity boxes via the user interface, the selection indicating one or more signals of interest, the one or more signals of interest being a subset of the plurality of RF signals;
   transmitting, to the sensor, a request to downlink buffered versions of the one or more signals of interest the buffered versions including audio data associated with the one or more signals;
   receiving and saving to the memory, the buffered versions of the one or more signals of interest; and
   displaying a plurality of activity symbols on the user interface as an activity display based on the selection and the associated signal data buffers, each activity symbol of the plurality of activity symbols representing the signal data associated with a period of time of a corresponding RF signal.

2. The method of claim 1, wherein the activity symbols are displayed in rows on the activity display based on channel and time, each row corresponding to a single RF signal over time.

3. The method of claim 1, wherein the activity display further comprises the metadata displayed for each channel.

4. The method of claim 1 further comprising:
   receiving a selection of an activity symbol of the plurality of activity symbols; and
   playing the audio data related to the selected activity symbol.

5. The method of claim 1, wherein the color and fill of each activity box is based at least in part on an amount of signal data in the memory and available for playback.

6. The method of claim 1 further comprising:
   receiving the plurality of RF signals within a RF spectrum at the radio sensor at a receiver of the radio sensor;
   decoding and demodulating the plurality of RF signals;
   determining metadata for each RF signal of the plurality of RF signals; and
   buffering one or more of the RF signals in memory.

7. The method of claim 1 wherein the signal data includes periodic reception of a corresponding RF signal of the plurality of RF signals.

8. The method of claim 1 wherein the metadata comprises at least one of signal frequency, signal bandwidth, signal-to-noise ratio (SNR), a signal UpTime, and a signal DownTime.

9. A ground station for receiving and displaying radiofrequency (RF) information collected at a radio sensor, the ground station comprising:
   a receiver configured to signal data from a radio sensor, the signal data being associated with a plurality of RF signals received at the radio sensor, the radio sensor being configured to buffer data related to a subset of the plurality of RF signals;
   a memory configured to store the signal data, the signal data including metadata data associated with each RF signal of the plurality of RF signals;
   one or more processors operably coupled to the receiver and the memory and configured to
      determine an activity level of each RF signal based on the metadata, the activity level indicating an amount of data received on each RF signal, and
      assign a color and fill to an activity box of plurality of activity boxes based on the activity level, each activity box corresponding to a single RF signal of the plurality of RF signals; and
   a user interface operably coupled to the one or more processors and configured to display the plurality of activity boxes via a box display;
   wherein the user interface is further configured to receive a selection of one or more activity boxes, the selection indicating one or more signals of interest, the one or more signals of interest being a subset of the plurality of RF signals, and wherein the one or more processors are further configured to transmit, to the sensor, a request to downlink buffered versions of the one or more signals of interest;

receive and save to the memory, the buffered versions of the one or more signals of interest; and display a plurality of activity symbols on the user interface as an activity display based on the selection and the associated signal data buffers, each activity symbol of the plurality of activity symbols representing the signal data associated with a period of time of a corresponding RF signal.

10. The ground station of claim 9, wherein the activity symbols are displayed in rows on the activity display based on channel and time, each row corresponding to a single RF signal over time.

11. The ground station of claim 9, wherein the color and fill of each activity box is based on an amount of signal data in the memory and available for playback.

12. A system for analyzing and displaying RF signal information including the ground station of claim 9, the system further comprising the radio sensor having:
   a receiver configured to receive a plurality of RF signals within a RF spectrum;
   a signal processing subsystem configured to
      decode and demodulate the plurality of RF signals,
      determine metadata for each RF signal of the plurality of RF signals, and
      store the RF signals as the signal data to a plurality of buffers in a sensor memory.

13. The ground station of claim 9 wherein the signal data includes periodic reception of a corresponding RF signal of the plurality of RF signals.

14. The ground station of claim 9 wherein the signal data includes metadata related to each buffered RF signal, the metadata including at least one of signal frequency, signal bandwidth, signal-to-noise ratio (SNR), a signal UpTime, and a signal DownTime.

15. A non-transitory computer readable medium comprising instructions, that when executed by one or more processors cause a computer to:
   receive signal data associated with a plurality of RF signals received at a radio sensor, the radio sensor being configured to buffer data related to a subset of the plurality of RF signals;
   store the signal data in a memory, the signal data including metadata data associated with each RF signal of the plurality of RF signals;
   determine an activity level of each RF signal based on the metadata, the activity level indicating an amount of data received on each RF signal;
   assign a color and fill to an activity box of plurality of activity boxes based on the activity level, each activity box corresponding to a single RF signal of the plurality of RF signals;
   display the plurality of activity boxes on a box display of a user interface;
   receive a selection of one or more activity boxes via the user interface, the selection indicating one or more signals of interest, the one or more signals of interest being a subset of the plurality of RF signals;
   transmit a request to downlink buffered versions of the one or more signals of interest the buffered versions including audio data associated with the one or more signals;
   receive and store the buffered versions of the one or more signals of interest; and
   display a plurality of activity symbols on the user interface as an activity display based on the selection and the associated signal data buffers, each activity symbol of the plurality of activity symbols representing the signal data associated with a period of time of a corresponding RF signal.

16. The non-transitory computer readable medium of claim 15 wherein the activity symbols are displayed in rows on the activity display based on channel and time, each row corresponding to a single RF signal over time.

17. The non-transitory computer readable medium of claim 15 wherein the activity display further comprises metadata displayed for each channel.

* * * * *